(12) United States Patent
Bigman et al.

(10) Patent No.: US 10,929,378 B1
(45) Date of Patent: Feb. 23, 2021

(54) CROSS-APPLICATION QUERY ANALYSIS TO PRODUCE DATABASE RECOMMENDATIONS

(71) Applicant: EMC IP Holding Company LLC, Hopkinton, MA (US)

(72) Inventors: Ron Bigman, Holon (IL); Tomer Kushnir, Ramat-gan (IL); Nir Sela, Kochav Yair (IL); Adi Hirschtein, Givataim (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 305 days.

(21) Appl. No.: 15/281,774

(22) Filed: Sep. 30, 2016

(51) Int. Cl.
*G06F 16/23* (2019.01)
*G06F 16/248* (2019.01)
*G06F 16/2455* (2019.01)
*H04L 29/08* (2006.01)

(52) U.S. Cl.
CPC ........ *G06F 16/2365* (2019.01); *G06F 16/248* (2019.01); *G06F 16/2455* (2019.01); *H04L 67/10* (2013.01)

(58) Field of Classification Search
None
See application file for complete search history.

(56) References Cited

U.S. PATENT DOCUMENTS

| | | | |
|---|---|---|---|
| 2007/0250188 A1* | 10/2007 | Kuhner | G05B 19/0426 700/83 |
| 2008/0133456 A1* | 6/2008 | Richards | G06F 17/30306 |
| 2013/0097706 A1* | 4/2013 | Titonis | G06F 21/56 726/24 |
| 2015/0082432 A1* | 3/2015 | Eaton | H04L 47/785 726/23 |
| 2016/0299933 A1* | 10/2016 | Fillipi | G06F 16/2343 |
| 2017/0034016 A1* | 2/2017 | Carroll | H04L 41/0813 |
| 2018/0032862 A1* | 2/2018 | Oliner | G06N 3/0445 |
| 2018/0067841 A1* | 3/2018 | Mahimkar | G06F 11/3668 |

* cited by examiner

*Primary Examiner* — Tony Mahmoudi
*Assistant Examiner* — Umar Mian
(74) *Attorney, Agent, or Firm* — Anderson Gorecki LLP

(57) ABSTRACT

Instances of client applications running independently on different devices are monitored to generate metadata records that are stored in cloud storage. Metadata records in cloud storage that have an aspect in common are grouped and used for comparative analysis. For example, metadata records for instances of the same client application, database, query or database structure may be grouped. Reports may be generated based on the analysis. The reports may indicate comparative performance, irregular activity, patch version and configurations associated with performance degradation, and recommended actions to improve performance.

20 Claims, 4 Drawing Sheets

CROSS-APPLICATION QUERY ANALYSIS TO PRODUCE DATABASE RECOMMENDATIONS

BACKGROUND

The subject matter of this disclosure is generally related to data storage systems that store large data sets for supporting multiple client applications and concurrent users. A data storage system may include storage arrays and remote cloud storage. A cloud storage service provider may use the same storage infrastructure to provide storage services to multiple subscribers.

SUMMARY

All examples, aspects and features mentioned in this document can be combined in any technically possible way.

In accordance with an aspect an apparatus comprises: in a system comprising cloud storage and a plurality of instances of client applications that run independently on different devices, program code stored on a non-transient computer-readable medium to: monitor the instances of the client applications to generate respective metadata records; send the metadata records to the cloud storage; search the cloud storage for metadata records having an aspect in common; organize the metadata records that have an aspect in common as a group; analyze the metadata records of the group by comparing at least one metadata record of the group with other metadata records of the group; and generate an output based on results of analyzing the metadata records. In some implementations the output comprises a report of comparative performance of a first client application instance relative to a subset of statistically similar client application instances that differ from the first client application instance. In some implementations the output comprises a recommendation of how to improve performance of a first client application instance. In some implementations the output comprises a report of irregular activity. In some implementations the output comprises a report of a configuration associated with performance degradation. In some implementations the output comprises a report of a patch associated with performance degradation. In some implementations the aspect in common is a same client application. In some implementations organizing the metadata records into the group comprises further organizing the metadata records into sub-groups based on active client application modules. In some implementations the aspect in common comprises a query type. In some implementations the aspect in common comprises a database structure.

In accordance with an aspect a method comprises: monitoring instances of the client applications that run independently on different devices to generate respective metadata records; sending the metadata records to the cloud storage; searching the cloud storage for metadata records having an aspect in common; organizing the metadata records that have an aspect in common as a group; analyzing the metadata records of the group by comparing at least one metadata record of the group with other metadata records of the group; and generating an output based on results of analyzing the metadata records. In some implementations generating an output comprises generating a report of comparative performance of the first client application instance relative to a subset of statistically similar client application instances of the group that differ from the first client application instance. In some implementations generating an output comprises generating a recommendation of how to improve performance of a first client application instance. In some implementations generating an output comprises reporting irregular activity. In some implementations generating an output comprises reporting a configuration associated with performance degradation. In some implementations generating an output comprises reporting a patch associated with performance degradation. In some implementations searching comprises searching for instances of a same client application. In some implementations organizing the metadata records into the group comprises further organizing the metadata records into sub-groups based on active client application modules. In some implementations searching comprises searching for same query type. In some implementations searching comprises searching for same database structure.

DETAILED DESCRIPTION

Some aspects, features and implementations described herein may include machines such as computer devices, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors.

Figure 1:
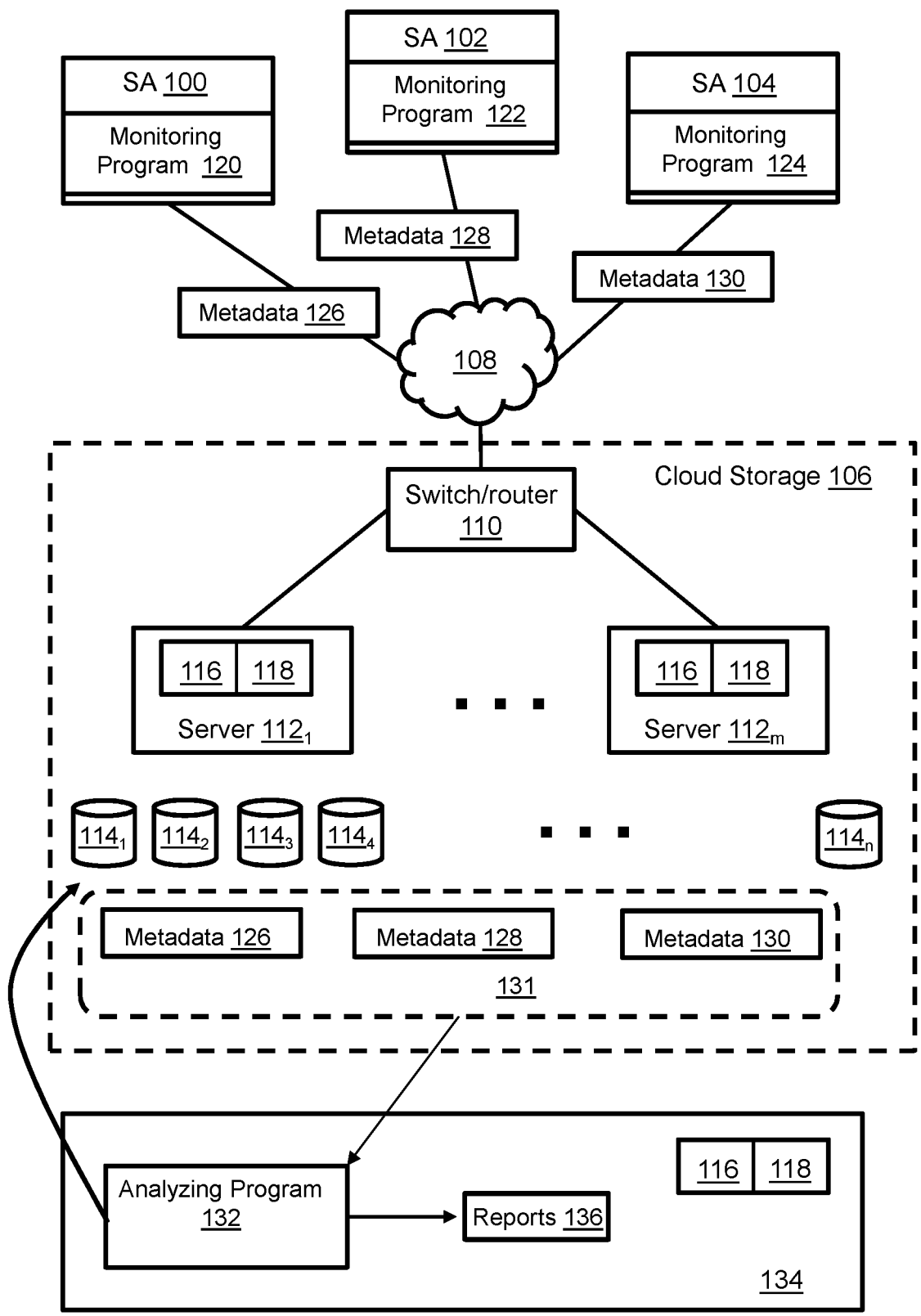
FIG. 1 illustrates an exemplary data storage system in which metadata associated with different client applications is gathered by different monitoring programs, sent to cloud storage, and used to perform cross-application analysis.

FIG. 1 illustrates an exemplary data storage system that includes multiple storage arrays 100, 102, 104 and a cloud storage system 106. The storage arrays are connected to the cloud storage system via a network 108. The network 108 may include various types of network nodes, e.g. switches, routers, hubs, and other network devices. The network may be private, public, or a combination thereof, and may include one or more of the Internet, a WAN (wide area network), MAN (metropolitan area network), LAN (local area network), and SAN (Storage Area Network). The cloud storage system 106 includes a switch/router 110, a cluster of servers $112_1$-$112_m$, and managed data storage devices $114_1$-$114_n$. Each server in the cluster includes a processor 116 and memory 118. The cloud storage system 106 is shared by all of the storage arrays, each of which may be associated with a different subscriber, e.g. a different entity such as different businesses. For example, data may be moved from a storage array to the cloud storage for archival.

A respective instance of a monitoring program 120, 122, 124 is associated with each storage array 100, 102, 104. The monitoring programs may run on the storage arrays or any other device in the data storage system. Each monitoring program monitors data access activities associated with a client application and generates metadata that describes those data access activities. In the illustrated example monitoring program 120 generates metadata 126, monitoring program 122 generates metadata 128, and monitoring program 124 generates metadata 130. Examples of client applications may include applications that utilizes databases and perform tasks such as management of sales, accounting, engineering production, inventory, personnel, buildings, and documents, examples of which include but are not limited to SAP, OAP and Amdocs. Metadata records from each monitoring program is sent to cloud storage 106, where the metadata records are stored.

An analyzing program 132 running on a remote computer 134 (with a processor 116 and memory 118) or any other computing device in the data storage system performs a search of the metadata records stored in cloud storage. The analyzing program groups metadata records on the basis of at least one common aspect. For example and without limitation, metadata records associated with instances of the same client application or database type may be grouped together. In the illustrated example metadata 126, 128, and 130 are organized in group 131. A search function of the analyzing program may be utilized to identify metadata records that shares a common aspect. Metadata that does not share the common aspect is excluded from the group. As a result, multiple groups may be created based on various different common aspects. The analyzing program 132 uses the grouped metadata records 126, 128, 130 from the different monitoring programs 120, 122, 124 to perform analysis and generate reports 136. The reports may include recommendations based on comparison of the metadata from different client application instances. For example, processing of the same types of database queries or accesses to the same types of database structures by different instances of the same or similar type of client application may be compared. In general, performance of the same task by different instances of the same client application can be used to generate statistical data that indicates through comparison of different records whether one or more client application instances exhibits abnormally poor performance or some other anomalous behavior when performing that task. Differences between the instances of the client application, for example and without limitation, configuration and version differences, can be identified as possible causes of performance and other problems in the reports 136. The existence of metadata from multiple instances of the same client application (or client application type) associated with different subscribers within the same cloud storage system facilitates comparative analysis because the metadata records exist in one location, e.g. and without limitation a single data center.

Figure 2:
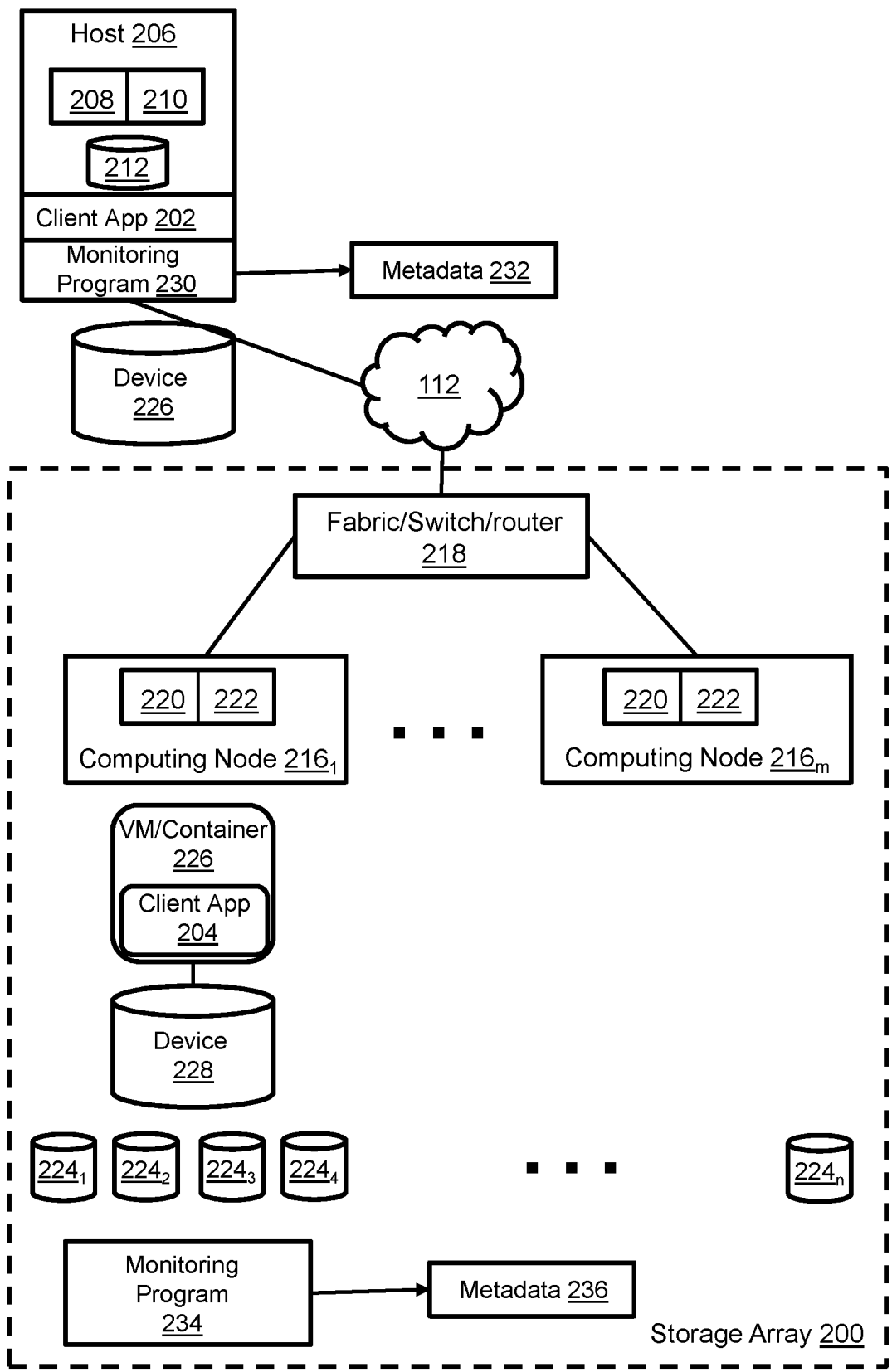
FIG. 2 illustrates implementations of the monitoring program on a host computer and a storage array.

As shown in FIG. 2, the monitoring programs may be implemented on a host computer 206 and/or on a storage array 200 or other device. The storage array 200 provides data storage services for client applications 202, 204. Client application 202 runs on host computer 206. Client application 204 runs on the storage array 200. The host computer 206 includes a tangible processor 208, volatile memory 210 and persistent storage 212. The volatile memory may include RAM (random access memory) and the persistent storage may include HDDs (hard disk drives) and SSDs (solid state devices, e.g. and without limitation flash). The processing, memory and storage resources of the host computer 206 are used to run the hosted client application 202. The storage array 200 hosts client application 204. The storage array includes a plurality of computing nodes $216_1$-$216_m$ that are interconnected via a fabric/switch/router 218. Each computing node is a tangible computing device that includes at least one processor 220 and volatile memory 222, and may be associated with a subset of managed devices $224_1$-$224_n$. The volatile memory may include RAM and the persistent storage and managed devices may include HDDs and SSDs. Computing node $216_1$ supports operation of a virtual machine/container 226. Although there are distinctions between VMs (virtual machines) and containers as recognized in the art, both are referenced herein as a single type of component for simplicity of explanation. Access to the processor and memory of the server by the client application 204 is managed by the VM/container 226 in which the application is situated. More particularly, the VM/container limits the client application therein to specific server resources or a specific amount of computing node resources, e.g. and without limitation one or more of a number of processor cores, specific processor cores, an amount of memory and an address range of memory. The VM/container also controls access of the client application to the managed devices. A separate logical storage device 226, 228 may be generated for each client application 202, 204. Without limitation, the logical storage devices may be referred to as a devices, logical volumes, production volumes, production LUNs or host LUNs, where LUN (logical unit number) is a number used to identify the logical storage volume in accordance with the SCSI (small computer system interface) protocol. Each logical storage device represents an abstraction layer between the managed devices and the hosted application. From the perspective of the client application the logical storage device is a single data storage device having a set of contiguous fixed-size LBAs (logical block addresses) on which data used by the client application resides. However, the data used by the client application may actually be maintained by the computing node at non-contiguous addresses on various different managed devices. The cloud storage system maintains metadata (not illustrated) indicative of the locations of extents of data on the managed devices. Consequently, the computing nodes can use the metadata to determine the actual location of data on the managed devices based on a reference to the logical storage device in an TO from the client application. Operation of the client applications includes generation of IOs (input-output operations) to access the storage resources of the storage array, e.g. to read and write from/to the managed devices. A first instance of the monitoring program 230 running on the host computer 206 monitors client application 202 and generates metadata 232. A second instance of the monitoring program 234 running on the storage array 200 monitors client application 204 and generates corresponding metadata 236. However the monitoring programs do not necessarily run on the same device as the client application being monitored. Metadata 232 and metadata 236 from the monitoring programs is sent to cloud storage.

Figure 3:
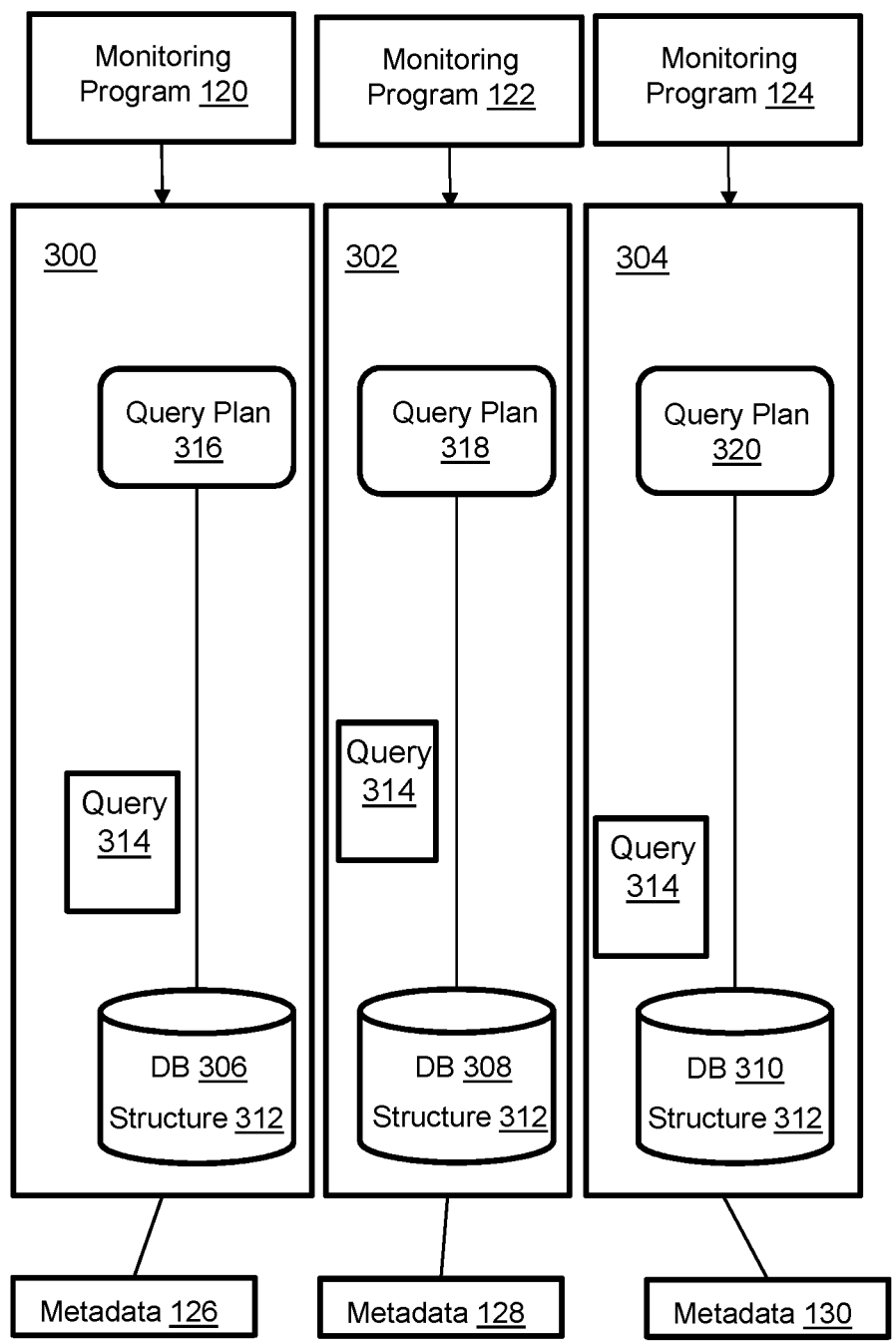
FIG. 3 illustrates operation of the monitoring program in greater detail.

FIG. 3 illustrates monitoring in greater detail. Monitoring programs 120, 122, 124 monitor activities associated with three different instances 300, 302, 304 of the same client application. The monitored activities may include formulating the same query type and accessing the same type of database structure. Each instance of the client application utilizes a respective instance 306, 308, 310 of the same type of database. The different instances of that database use the same database structure 312. Each instance of the client application generates the same database query 314 to access the same database structure 312. However, the different instances of the client application may utilize different query plans 316, 318, 320. Each query plan is an ordered set of steps used to access data from the database structures in the associated database. There may be multiple alternative ways to execute a given query. Further, different ways of executing a query may differ in terms of efficiency so performance is in-part a function of query plan effectiveness. When a query is submitted to the database an optimizer evaluates multiple possible plans for executing the query and selects one of the plans. However, based on various factors the selected query plan may not be the highest performing query plan, and not every optimizer will necessary select the same plan. For example, when two tables are joined together the query optimizer decides which table will be accessed first, whether or not an index will be used, which table will be accessed second, and using which index, and different query optimizers may make different selections. Because instances of the same (or similar) databases will have the same structures, e.g. the same table, and also the same types of queries, the same type of query may run in a different manner with respect to the same types of database structures in each database. Consequently, metadata 126, 128, 130 generated by the monitoring programs may indicate performance differences and enable grouping based on common aspects. The metadata may include a wide variety of information including but not limited to: client application name, client application modules in use, DB (database) name, DB host address, read response time, redo write response time, storage (logical device) redo write response time, DB TOPS, storage TOPS, DB MB/s (average data transfer rate including reads from data files and temporary files and writes to data files, temporary files and redo logs), storage MB/s, and DB R/W ratio. As will be explained in greater detail below, performance statistics that indicate differences between client applications may indicate shortcomings in the query plan of an underperforming database/application. Further, it may be possible to improve performance of that database/application by updating the query optimizer in a manner that is consistent with the query optimizers of better performing databases/applications. The monitored information may be used to generate reports that include one or more of comparative performance analysis, indications of irregular activity, and indications of performance problems associated with particular patch upgrades and configurations.

Figure 4:
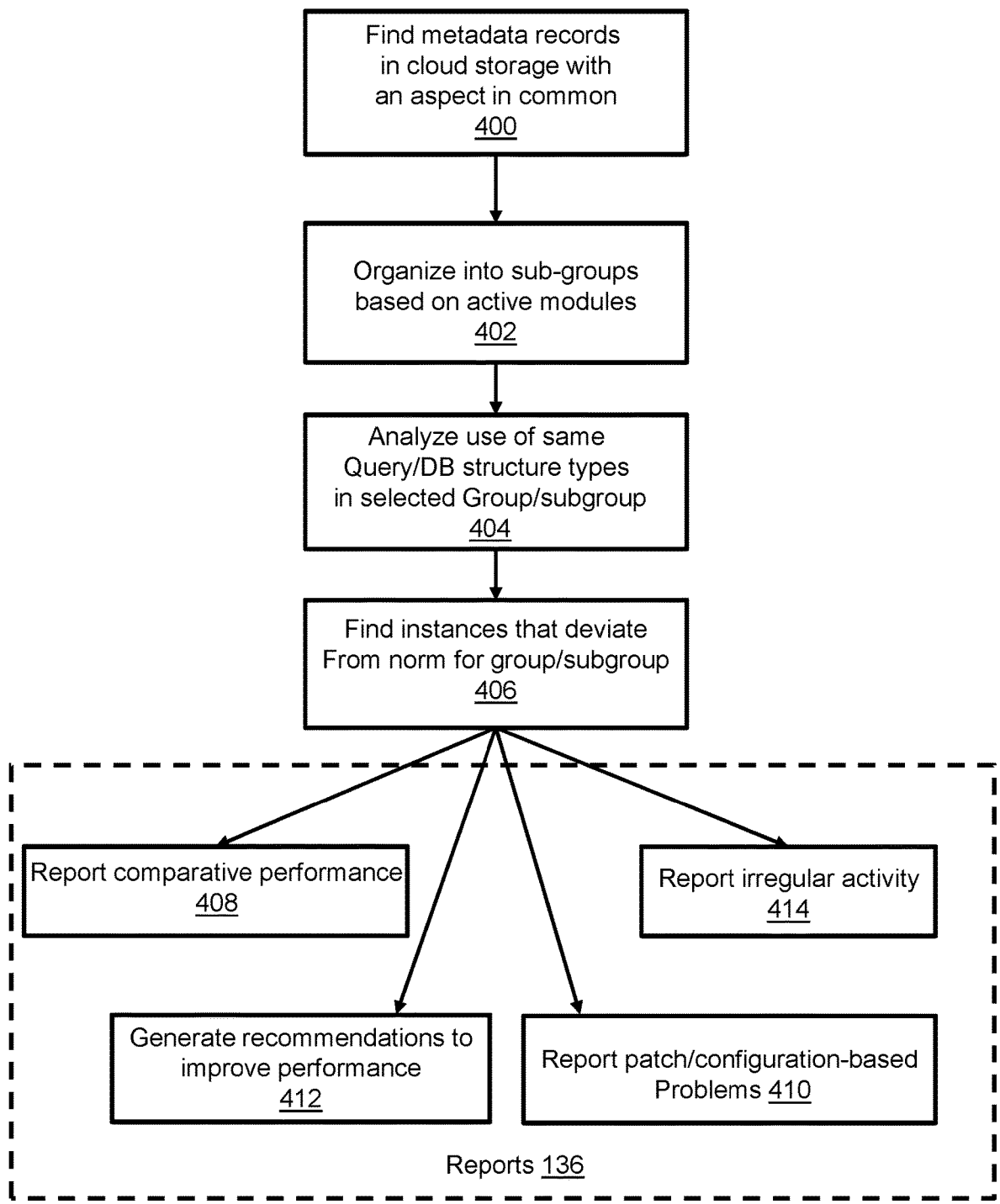
FIG. 4 illustrates operation of the analyzing program in greater detail.

FIG. 4 illustrates operation of the analyzing program to produce reports 136 with database recommendations. As indicated in block 400 the analyzing program searches the cloud storage system to discover stored metadata records that can be grouped based on a common aspect. For example and without limitation, metadata records may be grouped based on association with different instances of the same client application, database type, query type and database structure. As indicated in block 402 the discovered set of metadata records may be further refined based on active modules if the client application is module-based. For example, instances of a client application running only an accounting module might be placed in one sub-group and instances of the client application running accounting and document archiving modules might be placed in another sub-group. As indicated in block 404 the analyzing program analyzes group/sub-group processing of the same query types to access the same database structure types. As indicated in block 406, based on that analysis the program finds client application instances (as indicated in the metadata) that deviate from the norm, e.g. and without limitation a group average or subset of statistically similar client application instances, or the sub-group norm if the client application instances are organized into sub-groups. For example, group/sub-group members for which processing of a given query type exhibits statistically significant deviation from the group/sub-group average may be flagged, or the norm may be based on a statistical cluster of members. A variety of reports 136 may be generated from the gathered information. As indicated in block 408 an aspect of a report may include a comparative performance analysis. For example, the group/sub-group member (client application instance) deviating from the norm (as indicated by the metadata) could be identified. The performance deviation may be quantified in the report. Further, the specific types of queries and database structures associated with the deviation could be identified. As indicated in block 410 another aspect of a report could include an indication of patch and configuration problems. For example, if the deviating group/sub-group member has recently reconfigured or installed a specific patch version and performance deteriorated afterwards, and the other members have not made the same change, then the report may identify the patch or configuration as a potential problem. As indicated in block 412 another aspect of the report is generating recommendations to improve performance. This may include a recommendation to avoid or install a particular configuration or patch version that decreases or increases performance. Recommendations might also include suggesting a query plan/optimized technique that is associated with acceptable or optimal performance in other group/sub-group members. As indicated in block 414 another aspect of the report is an indication of irregular activity. Irregular activity may be activity that is not necessarily associated with a performance problem but indicates unusual access relative to accesses in other group/sub-group members. Because instances of an application will typically operate in a consistent manner, an exception may indicate a security or privacy breach. For example, if a specific table is normally accessed to retrieve only one record at a time then a full table scan on this table may be deemed suspicious and therefore worthy of including in a report. In another example, a FA user may be expected to access finance related tables but not expected to access admin related tables. Thus, a combination of access by a particular user type to a particular database structure type may be identified as out of the norm for the group/sub-group and reported.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus for remote cross-application query analysis to identify and correct underperformance, comprising:
a cloud storage system comprising a plurality of servers that manage storage of data on arrays of drives and an analyzing program running on the cloud storage system to analyze client applications comprising:
a plurality of instances of a first client application associated with a first subscriber and running on a first cluster of host servers outside of the cloud storage system, wherein instances of the first client application are inaccessible by a second subscriber and instances of the first client application are inaccessible by the cloud storage system; and
a plurality of instances of a second client application associated with the second subscriber and running on a second cluster of host servers outside of the cloud storage system, wherein instances of the second client application are inaccessible by the first subscriber and instances of the second client applications are inaccessible by the cloud storage system;
wherein the instances of the first client application access a first database of a first type and the instances of the second client application access a second database of the first type; and
wherein the analyzing program code is stored on a non-transitory computer-readable medium, executed by at least one processor, and is responsive to metadata records sent to the cloud storage system to monitor programs that run on the host servers and monitor data access activities of the instances of the first client application and the instances of the second client application, the analyzing program configured to:
search the metadata records in the cloud storage system for metadata records having an aspect in common that indicates access to a common database type, the search identifying the instances of the first client application and the instances of the second client application as both accessing the first type of database;
organize the metadata records that have the aspect in common as a group and exclude metadata records that do not have the aspect in common from the group, including creation of a first group comprising metadata records of the instances of the first client application and metadata records of the instances of the second client application;
analyze the metadata records of the group by comparing at least one metadata record of the group with other metadata records of the group to identify an underperforming instance of the first client application and a configuration difference that correlates with underperformance of the first client application, including comparison of same types of database queries and accesses to same types of database structures by the instances of the first client application and the instances of the second client application; and
generate an output that indicates a configuration change to improve performance of the underperforming instance of the first client application on one of the different computing devices outside of the cloud storage system based on results of analyzing the metadata records by comparing at least one metadata record of the group with other metadata records of the group,
whereby the analyzing program enables the cloud storage system to remotely diagnose the first and second client applications without accessing the first and second client applications.

2. The apparatus of claim 1 wherein the output comprises a report of comparative performance of the underperforming instance of the first client application instance relative to a subset of statistically similar client application instances that differ from the first client application instance.

3. The apparatus of claim 1 wherein the output comprises a recommendation of how to improve performance of the underperforming instance of the first client application instance.

4. The apparatus of claim 1 wherein the output comprises a report of irregular activity.

5. The apparatus of claim 1 wherein the output comprises a report of a configuration associated with performance degradation.

6. The apparatus of claim 1 wherein the output comprises a report of a patch associated with performance degradation.

7. The apparatus of claim 1 wherein the aspect in common is a same client application.

8. The apparatus of claim 7 wherein organizing the metadata records into the group comprises further organizing the metadata records into sub-groups based on active client application modules.

9. The apparatus of claim 1 wherein the aspect in common comprises a query type.

10. The apparatus of claim 1 wherein the aspect in common comprises a database structure.

11. A method for remote cross-application query analysis to identify and correct underperformance, comprising:
responsive to metadata records generated and sent to a cloud storage system by monitoring instances of a first client application associated with a first subscriber and running on a first cluster of host servers outside of the cloud storage system, wherein instances of the first client application are inaccessible by a second subscriber and instances of the first client application are inaccessible by the cloud storage system, and monitoring instances of a second client application associated with the second subscriber and running on a second cluster of host servers outside of the cloud storage system, wherein instances of the second client application are inaccessible by the first subscriber and instances of the second client applications are inaccessible by the cloud storage system, and wherein the instances of the first client application access a first database of a first type and the instances of the second client application access a second database of the first type:
searching the metadata records in the cloud storage system for metadata records having an aspect in common that indicates access to a common database type, the search identifying the instances of the first client application and the instances of the second client application as both accessing the first database and the second database of the first type;
organizing the metadata records that have the aspect in common as a group and excluding metadata records that do not have the aspect in common from the group, including creating a first group comprising metadata records of the instances of the first client application and metadata records of the instances of the second client application;
analyzing the metadata records of the group by comparing at least one metadata record of the group with other metadata records of the group to identify an underperforming instance of the first client application and a configuration difference that correlates with underperformance of the first client application, including comparing same types of database queries and accesses to same types of database structures by the instances of the first client application and the instances of the second client application; and generating an output that indicates a configuration change to improve performance of the underperforming instance of the first client application on one of the different computing devices outside of the cloud storage system based on results of analyzing the metadata records by comparing at least one metadata record of the group with other metadata records of the group, whereby the analyzing program enables the cloud storage system to remotely diagnose the first and second client applications without accessing the first and second client applications.

12. The method of claim 11 wherein generating the output comprises generating a report of comparative performance of the underperforming instance of the first client application instance relative to a subset of statistically similar client application instances of the group that differ from the underperforming instance of the first client application instance.

13. The method of claim 11 wherein generating the output comprises generating a recommendation of how to improve performance of the underperforming instance of the first client application instance.

14. The method of claim 11 wherein generating the output comprises reporting irregular activity.

15. The method of claim 11 wherein generating the output comprises reporting a configuration associated with performance degradation.

16. The method of claim 11 wherein generating the output comprises reporting a patch associated with performance degradation.

17. The method of claim 11 wherein searching comprises searching for instances of a same client application.

18. The method of claim 17 wherein organizing the metadata records into the group comprises further organizing the metadata records into sub-groups based on active client application modules.

19. The method of claim 11 searching comprises searching for same query type.

20. The method of claim 11 wherein searching comprises searching for same database structure.

* * * * *